Patented Apr. 24, 1928.

1,667,200

UNITED STATES PATENT OFFICE.

CHARLES R. DOWNS, OF CLIFFSIDE, AND LOUIS WEISBERG, OF GRANTWOOD, NEW JERSEY, ASSIGNORS TO THE BARRETT COMPANY, A CORPORATION OF NEW JERSEY.

WATER-RESISTANT CARBOXYLIC ACID-POLYHYDRIC ALCOHOL RESIN.

No Drawing. Original application filed December 22, 1920, Serial No. 432,408. Divided and this application filed September 7, 1921. Serial No. 498,997.

This application is a division of our application, Serial No. 432,408, filed December 22, 1920, and is directed to the matter defined by the claims appended hereto and forming a part hereof.

Resinous materials of widely different properties have heretofore been made from glycerol by suitable combination thereof with a dibasic aromatic acid alone, a dibasic aliphatic acid alone and also with a mixture of varying proportions of both an aromatic dibasic and an aliphatic dibasic acid. See U. S. Patents: 1,082,106, Dec. 23, 1913; 1,091,627, Mar. 31, 1914; 1,091,628, Mar. 31, 1914; 1,091,732, Mar. 31, 1914; 1,098,728, June 2, 1914; 1,098,776, June 2, 1914; 1,098,-777, June 2, 1914; 1,108,329, Aug. 25, 1914; 1,108,330, Aug. 25, 1914; 1,108,331, Aug. 25, 1914; 1,108,332, Aug. 25, 1914; 1,119,592, Dec. 1, 1914.

In the case of those materials from glycerol and phthalic acid (an anhydride-forming aromatic dibasic acid) alone this combination has been observed to pass through three stages, a first solid stage (the A-stage), a second solid stage (the B-stage) and a third solid stage (the C-stage). The ultimate industrial utility of these resinous products lies in their use in molding and like compositions. For this the above-described C-stage product is very superior to the corresponding B-stage product and can be used successfully in a large number of cases where the B-stage product is useless.

In the case of those materials from glycerol and a dibasic aliphatic acid or a mixture of dibasic aliphatic acid and an anhydride-forming dibasic aromatic acid, a solid product other than that corresponding to the B-stage product of the glycerol-aromatic dibasic acid group has never been described or indicated, although such B-stage products have themselves been known for many years.

Now, it remained for us to discover that these relatively useless B-stage products can be converted into very useful and highly desirable products which are then among the very best insulating materials available to the industries.

In addition we have also discovered that useful C-stage products can be made from the less useful B-stage products resulting from glycerol and a polynuclear aromatic acid, such as diphenic acid, 1.8 naphthalic acid, benzoyl-benzoic acid, methyl-benzoyl-benzoic acid and chlor-benzoyl-benzoic acid, and an aliphatic dibasic acid. Furthermore, we have also discovered that a tribasic aliphatic acid, such as citric acid and malo malic acid, can be employed in place of dibasic aliphatic acids, in producing useful C-stage products either alone or in mixture with the above-named aromatic acids.

In converting these relatively useless B-stage products into our new products, we have thereby caused the latter to retain substantially all of the elasticity and flexibility of the B-stage products from which they are respectively made, while we have at the same time increased the electrical insulating properties of our new product beyond that of the corresponding B-stage products. These changes, alone or together, would not add to the utility of the B-stage products in any substantial manner. However, our new products do differ from the B-stage products from which they are respectively derived in one most essential particular and the one which enables our new products to be used under circumstances where the corresponding B-stage products cannot be employed at all. These B-stage products are all decomposed or so altered by water that they cannot be employed in places where water contact is unavoidable such as in submarine cables or in exterior and openly exposed positions where they are subject to action of dew, rain, snow or frost. The B-stage products under these conditions become soft or spongy or porous, lose in elasticity and flexibility and also lose in cohesiveness, resistance to shock, friction and to the passage of electric current, while our new products suffer no material change in any or all of these respects through such water contact, while at the same time they can equally well be employed in any and all other uses to which the B-stage products have been successfully put.

To effect this change of the old B-stage products above referred to into our new products, we apply prolonged and high heating to these B-stage products until the change to our new products has been satisfactorily effected. In general, this is the same means employed to convert the B-stage products of the glycerol-phthalic acid resin into the corresponding C-stage product. (See U. S. Patent 1,108,330, August 25, 1914.)

In general, these A-stage products we operate with are hard without being sticky and are fusible; upon proper heating these A-stage products all become infusible and reach the B-stage which B-stage products, when submerged in boiling distilled water, becomes coated with a bloom, always in less than two minutes; these B-stage products, when further properly heated, remain infusible but lose the above described sensitiveness to water when the C-stage has been reached. These properties are so sharp and so characteristic that an operator can, with certainty, determine when he has arrived at each of these three stages, when making these materials in bulk.

We have employed the following polybasic aliphatic acids; among the dibasic acids we have employed and found useful are the following: fumaric acid; maleic acid; malic acid; succinic acid and tartaric acid; among the tribasic acids we have employed and found useful are citric acid and malo malic acid.

We have employed the following mixtures of the foregoing as well as others not mentioned below. The figures in the table represent the molecular proportions of each acid used.

| No. | Fumaric acid | Maleic acid | Malic acid | Succinic acid | Tartaric acid |
|---|---|---|---|---|---|
| 1 | 1.0 | 1.0 | | | |
| 2 | 1.5 | 0.5 | | | |
| 3 | 0.5 | 1.5 | | | |
| 4 | | | 1.0 | 1.0 | |
| 5 | 1.0 | | | 1.0 | |
| 6 | | | 1.0 | | 1.0 |
| 7 | | 1.0 | | 1.0 | |
| 8 | 1.0 | | | 1.0 | |
| 9 | 1.0 | | | | 1.0 |
| 10 | | | 1.0 | 1.0 | |
| 11 | | | 1.0 | | 1.0 |
| 12 | | | | 1.0 | 1.0 |

Accordingly, the expression phthalic acid as used above and hereinafter, when not otherwise specified or indicated, is intended to designate both the acid as such or its equivalent anyhdride.

We have employed phthalic acid, an aromatic dibasic acid, both as such and as its anhydride, in mixture with the foregoing dibasic aliphatic acids, as shown, for example, in the following table:

| No. | Phthalic acid | Fumaric acid | Maleic acid | Malic acid | Succinic acid | Tartaric acid |
|---|---|---|---|---|---|---|
| 1 | 1.0 | | 1.0 | | | |
| 2 | 1.5 | | 0.5 | | | |
| 3 | 0.5 | | 1.5 | | | |
| 4 | 1.0 | 1.0 | | | | |
| 5 | 1.5 | 0.5 | | | | |
| 6 | 0.5 | 1.5 | | | | |
| 7 | 1.0 | | | 1.0 | | |
| 8 | 1.0 | | | | 1.0 | |
| 9 | 1.0 | | | | | 1.0 |

We have employed glycerol, glycol, diglycerol and triglycerol, all of which are polyhydric alcohols or polyhydric alcoholic bodies. We make no claim to a resin made from phthalic anhydride alone because this is the subject of U. S. Patent 1,108,330, of August 25, 1914. We have discovered, however, that diphenic acid, 1.8 naphthalic acid and the benzoyl-benzoic acids form with the above mentioned alcohols resins which are unaffected by water and we herein claim these resins as part of our invention. Of the various benzoyl-benzoic acids we have used benzoyl-benzoic acid, methyl-benzoyl-benzoic acid and chlor-benzoyl-benzoic acid, which we made by condensation of phthalic anhydride with benzol, toluol and chlor-benzoyl respectively in the presence of aluminum chloride, in the manner well known to chemists, and have obtained satisfactory resins.

We have also made resins with each of these aromatic acids mixed with one or more of the previously mentioned polybasic aliphatic acids and have obtained satisfactory and useful results.

PRODUCING THESE PRODUCTS IN BULK.

*Example I—Part A.*

*A-stage resin from glycerol and maleic acid.*—Heat together quantities of glycerol and maleic acid in the proportion of one molecular weight of glycerol to one molecular weight of acid. The acid dissolves, forming a homogeneous mass. As the heating is continued, the melting point gradually rises, and the material, which at first is quite sticky and viscous, eventually loses its stickiness and becomes more solid when cold. The completion of the first reaction can be ascertained by taking out a small sample, and allowing it to cool. If the cooled product is viscous or tenaceous but not sticky, the reaction has gone far enough. At this stage the product is soluble in acetone, making a clear solution useful as a varnish. By this time the melting point is usually over 90° C. and may be as high as 120° C. (melting points taken by the method described on page 821, vol. 10, Journal of Industrial and Engineering Chemistry). The time required to reach this point may vary according to the temperature at which the heating is conducted, the bulk of the material employed, and the rate of stirring. It is seldom advantageous to let this temperature exceed 200° C. as it is then difficult to control the next step in the reaction. On the other hand, it is desirable to keep the temperature as high as possible (i. e., as near 200° C as possible) because the reaction otherwise proceeds slowly. For example, a batch of two pounds may be converted at 170° C. in approximately 20 hours. If the material is cooled before the next stage of the reaction sets in, the product obtained is fusible and soluble in cold acetone. This resin is also soluble at room temperature in ethyl alcohol and ethyl acetate although not so much as in acetone. It dissolves slightly in benzene. Cold water acts on it rapidly, causing it to become discolored and soft.

*Example I—Part B.*

B-stage resin from glycerol and maleic acid.—Heat the product of Example I— Part A until a specimen on suitable test shows that it is no longer fusible, that it is insoluble in cold acetone, and also that it is affected when submerged in boiling distilled water for two minutes. The temperature of heating may be as high as in Part A, but in that case the reaction becomes violent, frothing and evolution of heat take place, and the material becomes filled with bubbles. This frothy product may be rendered homogeneous by comminuting it and then molding it under heat and pressure. A bubble-free product may be obtained directly, however, by heating at a temperature properly at or near the melting point of the A-stage resin; the maximum temperature should not be above about 135° C. and the temperature may be as low as 90° C. or lower. By whichever method it is obtained, the resin is infusible and has no true melting point, although it softens sufficiently to be molded under heat and pressure. It is insoluble in acetone, ethyl alcohol, and ethyl acetate, but on standing in contact with any of these materials for a considerable time, the finely powdered resin swells and forms a sort of jelly-like mass. For example, a batch of two pounds may be converted at 135° C. in about ten hours from the A-stage resin to the B-stage resin.

*Example I—Part C.*

C-stage resin from glycerol and maleic acid.—Heat the product from Example I— Part B to a temperature of 170°–200° C. until a test specimen when submerged for two minutes in boiling distilled water does not show a bloom on its surface. The time required to accomplish this change depends on the temperature used and on the bulk of the material heated. With a large bulk of resin it is important at first not to raise the temperature too rapidly, for the resin is not a good conductor of heat and considerable time is required to equalize the temperature. The final temperature may be as high as 250° C. when time is important. For example, a batch of two pounds may be converted at 170° C in approximately 30 hours.

In place of maleic acid of Example I, we have used the following—malic acid; fumaric acid; succinic acid, and malo-malic acid, and with satisfactory results. Moreover, we have used various mixtures of these acids as well as mixtures containing one or more of these acids together with phthalic acid.

These final C-stage products are insoluble at room temperature in the following solvents: acetone, ethyl alcohol, benzene, ethyl acetate, chloroform, turpentine, ether, linseed oil, China wood oil, and petroleum transformer oil. They are infusible but soften sufficiently at temperatures above 140° C. to be molded under pressure. Mechanically, electrically, and chemically, these new products are superior to the A and B-stage products from which they are derived. Thus they are hard, tough, elastic, and well suited to the ordinary machining operations. They are resistant to heat, although they burn when put in a flame. The insulating value of the C-stage resins is considerably higher than that of the respective B-stage resins from which they are derived. The new products, moreover, are resistant to cold and to boiling water. Prolonged contact with cold water does not diminish the lustre or polish of the surface, and the water remains neutral to litmus. They are substantially unattacked at room temperature by 20% solutions of sulphuric, hydrochloric, nitric, or acetic acid, but they will not withstand concentrated sulphuric acid or hot concentrated nitric acid. They are not materially attacked within one hour by a 20% solution of caustic soda at the ordinary room temperature. However, on boiling in contact with this solution, the resins are decomposed, forming alcohols and sodium salts corresponding or related to the alcohols and acids used in their manufacture.

While these new C-resins can be used as such for certain purposes, the best, most convenient and practical method of manufacture is to apply the final heat treatment at the place or in the form of their ultimate use. This is particularly the case when fillers are to be incorporated with the resin, as it is often more convenient to compound the resin and fillers before the final heat treatment is applied.

For example, the finished C-resin may be finely ground, mixed with a suitable filler if desired, and molded by the application of heat and pressure in the way usual in such operations. We have found that we can employ not only the more expensive kinds of fillers, such as fibrous asbestos, cotton, wood pulp and the like, which have some mechanical strength of their own, but also the cheaper non-fibrous fillers, such as talc, rotten stone, wood flour, ground asbestos and other like inert powdery materials having no special mechanical strength of their own.

*Example II.*

Producing a molded article containing C-resin from the B-resin.—The B-resin and the filler, or fillers, are ground separately and then thoroughly mixed in the way usual in such operations. All the materials must be finely ground to produce an even mixture. The relative proportions of resin and filler will naturally vary according to the particular purpose for which the molding composition is intended. The mixture thus produced may be molded under heat and pressure, and the final heat treatment, as in Example I—Part C, then applied with the molded object still in the mold, or the heat treatment may be applied first and the composition then molded. It is not always necessary to carry out the entire heat treatment in the mold, and the molded object may be removed as soon as it has attained sufficient rigidity to maintain its proper form under further heating, thus releasing the mold for further use and consequently cheapening the process.

*Example III.*

Producing a molded article containing C-resin from the B-resin.—The B-resin is finely ground and allowed to stand in contact with acetone for a considerable time. The powdered resin swells and forms a jelly-like mass, which is also a suitable form for compounding with a large proportion of filler by kneading or passing between rolls in the usual way in such operations. The composition thus produced is heated to drive off any excess of solvent and may then be handled as in the preceding example. Alternatively, the composition may be molded before driving off the solvent, and the solvent may then be driven off while the object is still in the mold.

*Example IV.*

Producing a molded article containing C-resin from the A-resin.—The A-resin is melted and the finely ground filler added thereto. The mixture is thoroughly stirred and heated until it becomes infusible and has thus reached the B-stage. Heating is continued beyond this point as in Example I, to the C-stage; the composition is then ground and molded under heat and pressure in the usual way. Alternatively, the composition is heated only to the B-stage and is then molded and treated as under Example II.

In making a C-stage resin which is to be molded or a molding composition containing a C-stage resin, it is not necessary to complete the heat treatment entirely before the molding operation is carried out, but the heat treatment may be interrupted at such a stage that the heat applied in the subsequent molding operation suffices to produce a finished C-stage product.

Our new products can be distinguished with certainty from all other heretofore known products by making the following two tests:

I. Place a specimen thereof in boiling distilled water; if its surface remains bright and does not become dull in two minutes, it is water-resistant in the sense we have herein used and will hereafter use that expression.

II. Boil a specimen, say 1 gram, with ten times its bulk of a 20% solution of caustic soda in water until all or nearly all has gone into solution; filter; cool; acidify with hydrochloric acid. From the product of these operations tartaric acid, fumaric acid or succinic acid can all be recovered as such by means usual with chemists for such purposes, from such resins in whose production they have been employed. Maleic acid and malic acid may be recovered partly as such, but these acids, when used for making our new products, may also be recovered entirely or in part only as fumaric acid, which is a well known transformation product of each of those two acids.

We have described generally a continuous and continuing procedure from a mixture of glycerol and an acid or acids to the final water-resistant C-stage resin, but we wish it to be understood that either such a continuous or such discontinuous process can be used with equal satisfaction. That is, we may proceed from the glycerol and acids to either the A-stage or the B-stage and subsequently to the C-stage, or we may begin with the A-stage or B-stage resin and proceed to C-stage resin therefrom.

These resins all belong to the general class of plastics, and while we have specifically mentioned that they can be used to produce a molded article, it must be obvious to all that they are by no means restricted to such enumerated uses but can be used in many other places and in many other operations and for many other purposes where plastic materials can be used. It is also obvious that our invention includes these resins whether produced and used as such or whether produced in admixture or association with other ingredients, or used in admixture or association with other ingredients, and that the term "resin" as used in the claims is not to be construed as excluding the association or admixture of other ingredients with said resins.

We claim:—

1. A water-resistant succinic acid-glycerol resin.

2. The process of making a resin, which comprises heating succinic acid and a polyhydric alcohol for about 20 hours between 170° and 200° C., then below 135° C. for about 10 hours, then between 170° and 250° C. until a water-resistant resin results.

3. The process of making a resin, which comprises heating succinic acid and glycerol for about 20 hours between approximately 170° and 200° C., then below 135° C. for about 10 hours, then between 170° and 250° C., until a water-resistant resin results.

4. The process of making a resin, which comprises heating succinic acid, an anhydride forming aromatic dibasic carboxylic acid and glycerol for about 20 hours between approximately 170° and 200° C., then below 135° C. for about 10 hours, then between 170° and 250° C. until a water-resistant resin results.

5. The process of making a resin, which comprises heating succinic acid, an anhydride forming aromatic dibasic carboxylic acid and a polyhydric alcohol for about 20 hours between approximately 170° and 200° C., then below 135° C. for about 10 hours, then between 170° and 250° C. until a water-resistant resin results.

6. The process of making a resin, which comprises heating succinic acid, phthalic acid and glycerol for about 20 hours between approximately 170° and 200° C., then below 135° for about 10 hours, then between 170° and 250° C. until a water-resistant resin results.

7. A water-resistant succinic acid-anhydride forming aromatic dibasic carboxylic acid-glycerol resin.

8. A water-resistant succinic acid-anhydride forming aromatic dibasic carboxylic acid-polyhydric alcohol resin.

9. A water-resistant resin such as can be obtained from succinic acid and a polyhydric alcohol.

10. A water-resistant resin such as can be obtained from succinic acid, phthalic acid and glycerol.

11. The process of making a resin which comprises heating succinic acid, phthalic acid and a polyhydric alcohol for about 20 hours between approximately 170° and 200° C., then below 135° for about 10 hours, then between 170° and 250° C. until a water-resistant resin results.

12. A water-resistant succinic acid-phthalic acid-polyhydric alcohol resin.

In testimony whereof we affix our signatures.

CHARLES R. DOWNS.
LOUIS WEISBERG.